United States Patent
Görrissen et al.

(10) Patent No.: US 6,683,133 B1
(45) Date of Patent: Jan. 27, 2004

(54) ASA MOLDING COMPOUNDS FOR PRODUCING SHAPED PARTS

(75) Inventors: Heiner Görrissen, Ludwigshafen (DE); Herbert Morgenstern, Ellerstadt (DE); Graham Edmund Mc Kee, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/762,930

(22) PCT Filed: Aug. 20, 1999

(86) PCT No.: PCT/EP99/06114
§ 371 (c)(1),
(2), (4) Date: Feb. 14, 2001

(87) PCT Pub. No.: WO00/11080
PCT Pub. Date: Mar. 2, 2000

(30) Foreign Application Priority Data

Aug. 20, 1998 (DE) .......................... 198 37 854

(51) Int. Cl.⁷ .............................. C08L 55/02
(52) U.S. Cl. .......................... 525/63; 525/67; 525/68; 525/69; 525/70
(58) Field of Search ................ 523/201; 525/70, 525/66, 67, 68, 69, 63

(56) References Cited

U.S. PATENT DOCUMENTS 5,475,053 A  12/1995  Niessner et al.
6,177,517 B1 * 1/2001 Guntherberg

FOREIGN PATENT DOCUMENTS

| | | |
|---|---|---|
| EP | 244 856 | 11/1987 |
| EP | 244 857 | 11/1987 |
| EP | 269 324 | 6/1988 |
| EP | 576 960 | 1/1994 |
| WO | 98/23796 | 7/1998 |
| WO | 99/15589 | 4/1999 |

* cited by examiner

*Primary Examiner*—Jeffrey Mullis
(74) *Attorney, Agent, or Firm*—Keil & Weinkauf

(57) ABSTRACT

The thermoplastic molding compositions proposed comprise

A) from 20 to 90% by weight, preferably from 30 to 80% by weight, particularly preferably from 40 to 75% by weight, of a thermoplastic polymer, and B) from 10 to 80% by weight, preferably from 20 to 70% by weight, particularly preferably from 25 to 60% by weight, of a crosslinked rubber having two or more phases, where the polymer A has a viscosity number, measured on a 0.5% strength solution in dimethylformamide at 23° C., of from 50 to 70 ml/g, preferably from 55 to 65 ml/g, and where at least 80% by number, preferably at least 85% by number, particularly preferably at least 90% by number, of the rubber particles B in the dispersion, after the preparation thereof, have a diameter of <0.2 μm, preferably <0.18 μm, particularly preferably <0.15 μm.

10 Claims, No Drawings

ASA MOLDING COMPOUNDS FOR PRODUCING SHAPED PARTS

The invention relates to thermoplastic molding compositions made from a polystyrene-acrylonitrile polymer and from a crosslinked rubber having two or more phases, and to molded materials produced therefrom, and also to a process for producing molded materials by coextrusion.

In certain application sectors for thermoplastic polymer materials, in particular in the internal fitting of automobiles and in household, electrical and sport equipment, there is increasing demand for a non-reflective, matt surface. This may be for decorative or safety reasons, e.g. reduced glare for the driver of the automobile, or to improve performance characteristics—fingerprints are difficult to see on matt surfaces. However, most commercially available impact-modified molding compositions give moldings with glossy surfaces.

Matt moldings can be achieved by surface-treatment of a finished molding with normal gloss, for example by mechanical roughening, such as grinding or brushing, or by etching, solvation or swelling, or by applying a matt coating. However, a factor common to all of these processes is a disadvantageous additional operation on the finished molding.

Moldings with a matt surface may also be produced using tools or molds with a structured surface, but the structuring of the mold wears away comparatively quickly. Inorganic matting agents, such as silica gel or chalk, can be added to polymers, but the disadvantage is impairment of the mechanical properties of the molding.

This adverse effect can be avoided by addition of suitable organic matting agents. They are composed of particles of comparatively large diameter (D>about 0.5 $\mu$m) dispersed in matrix polymers. The particles protrude to some extent from the smooth and therefore glossy surface of the matrix polymer and thus create a diffuse reflection of incident light (scattering), so that to an observer the surface appears matt.

Many applications require polymers which are simultaneously matt and impact-resistant. If a rigid, brittle polymer is to be modified in this way in a single operation the large matting particles must simultaneously have elastomeric properties. To make the matting rubber particles compatible at least to some extent with the nonelastic matrix polymer the former usually have to be provided with a graft shell made from a polymer with some degree of compatibility.

EP-A 269 324 discloses graft polymers of this type which have large particle diameters and are elastomeric and also have matting action. However, the process to prepare the particles is very laborious. A first step prepares elastomeric core particles, and in a subsequent step these are swollen with freshly added monomer, and the polymerization is then continued. This procedure is repeated, if desired, until the required particle size has been achieved, and the graft shell is then produced.

EP-A 576 960 gives another way of achieving matt and impact-resistant molded material compositions, by producing relatively large particles through the agglomeration of small particles of graft polymers whose graft core comprises acid groups and whose shell comprises basic groups, or vice versa. However, in some cases only a limited matting effect is attainable by this route.

A further requirement placed upon the surface properties of polymer molded materials is generally that these are uniform, free from flow lines, streaks and marks.

It is an object of the present invention to provide thermoplastic molding compositions whose surface properties are improved and which are both matt and free from flow lines.

We have found that this object is achieved by means of thermoplastic molding compositions comprising A) from 20 to 90% by weight, preferably from 30 to 80% by weight, particularly preferably from 40 to 75% by weight, of a thermoplastic polymer composed of units deriving from
  a1) from 60 to 85% by weight, preferably from 63 to 81% by weight, particularly preferably from 65 to 80% by weight, of styrene and/or substituted styrene, in particular $\alpha$-methylstyrene,
  a2) from 15 to 40% by weight, preferably from 19 to 37% by weight, particularly preferably from 20 to 35% by weight, of acrylonitrile, and
  a3) from 0 to 25% by weight, preferably from 0 to 20% by weight, particularly preferably from 0 to 18% by weight, of other monomers copolymerizable with a1 and a2, and B) from 10 to 80% by weight, preferably from 20 to 70% by weight, particularly preferably from 25 to 60% by weight, of a crosslinked graft rubber having two or more phases and composed of
  b1) from 30 to 90% by weight, preferably from 40 to 70% by weight, particularly preferably from 45 to 70% by weight, of a phase prepared by emulsion or miniemulsion polymerization of
    b1.1) from 80 to 100% by weight, preferably from 90 to 100% by weight, particularly preferably from 95 to 100% by weight, of an acrylate, and
    b1.2) from 0 to 20% by weight, preferably from 0 to 10% by weight, particularly preferably from 0 to 5% by weight, of other monomers, and
  b2) from 10 to 70% by weight, preferably from 30 to 60% by weight, particularly preferably from 30 to 55% by weight, of at least one other phase prepared by polymerizing
    b2.1) from 60 to 85% by weight, preferably from 70 to 80% by weight, of styrene,
    b2.2) from 15 to 35% by weight, preferably from 20 to 30% by weight, of acrylonitrile and
    b2.3) from 90 to 20% by weight of other monomers, in the presence of the first phase.

In the thermoplastic molding compositions the polymer A has a viscosity number, measured on a 0.5% strength solution in dimethylformamide at 23° C., of from 50 to 70 ml/g, preferably from 55 to 65 ml/g, and at least 80% by number, preferably at least 85% by number, particularly preferably at least 90% by number, of the rubber particles B in the dispersion, after the preparation thereof, have a diameter of <0.2 $\mu$m, preferably <0.18 $\mu$m, particularly preferably <0.15 $\mu$m.

This class of products is known as ASA since it is composed of acrylonitrile, styrene and an acrylate.

Surprisingly, it has been found that by processing molding compositions made from a polystryrene-acrylonitrile matrix and, embedded into this, crosslinked rubber particles, a rough surface is obtained which scatters light and therefore has a matt appearance, with small-diameter rubber particles dispersed in the polystyrene-acrylonitrile matrix. It has also been found that the surface of the resultant molded materials after coextrusion with other plastics, in particular ABS, is free from flow lines if a free-flowing polystyrene-acrylonitrile matrix is used.

Component A in the novel thermoplastic molding compositions is from 20 to 90% by weight, preferably from 30 to 80% by weight, particularly preferably from 40 to 75% by weight, of a thermoplastic polymer composed of units deriving from a1) from 60 to 85% by weight, preferably from 63 to 81% by weight, particularly preferably from 65 to 80% by weight, of styrene and/or substituted styrene, in particular α-methylstyrene, a2) from 15 to 40% by weight, preferably from 19 to 37% by weight, particularly preferably from 20 to 35% by weight, of acrylonitrile, and a3) from 0 to 25% by weight, preferably from 0 to 20% by weight, particularly preferably from 0 to 18% by weight, of other monomers copolymerizable with a1 and a2.

Other monomers a3) whose use is preferred are (meth) acrylic acid and/or its derivatives, in particular methyl methacrylate, acrylamide and/or methacrylamide, and also maleic anhydride and/or phenylmaleimide.

Component B in the thermoplastic molding compositions is from 10 to 80% by weight, preferably from 20 to 70% by weight, particularly preferably from 25 to 60% by weight, of a crosslinked graft rubber having two or more phases and composed of b1) from 30 to 90% by weight, preferably from 40 to 70% by weight, particularly preferably from 45 to 70% by weight, of a phase prepared by emulsion or miniemulsion polymerization of b1.1) from 80 to 100% by weight, preferably from 90 to 100% by weight, particularly preferably from 95 to 100% by weight, of an acrylate, and b1.2) from 0 to 20% by weight, preferably from 0 to 10% by weight, particularly preferably from 0 to 5% by weight, of other monomers, and b2) from 10 to 70% by weight, preferably from 30 to 60% by weight, particularly preferably from 30 to 55% by weight, of at least one other phase prepared by polymerizing b2.1) from 60 to 85% by weight, preferably from 70 to 80% by weight, of styrene, b2.2) from 15 to 35% by weight, preferably from 20 to 30% by weight, of acrylonitrile and b2.3) from 0 to 20% by weight of other monomers, in the presence of the first phase.

The phase b1) of the crosslinked rubber B preferably has a glass transition temperature of <0° C., preferably <−10° C., particularly preferably <−15° C., and is predominantly (from 80 to 100% by weight, preferably from 90 to 100% by weight, particularly preferably from 95 to 100% by weight) composed of acrylates, in particular butyl acrylate and/or ethylhexyl acrylate. This rubber phase b1) may comprise other monomers b1.2), in particular methacrylates, styrene and/or acrylonitrile. Particularly preferred monomers b1.2) are polyfunctional crosslinking monomers, preferably selected from the following group: divinylbenzene, diallyl maleate, diallyl fumarate, diallyl phthalate, allyl methacrylate, triallyl isocyanurate, butadiene, isoprene and dihydrodicyclopentadienyl acrylate, particularly preferably dihydrodicyclopentadienyl acrylate.

The rubber phase b1) is prepared by emulsion polymerization of the monomers or by miniemulsion polymerization.

The rubber B has at least one other phase, prepared by polymerizing b2.1) from 60 to 85% by weight, preferably from 70 to 80% by weight, of styrene, b2.2) from 15 to 35% by weight, preferably from 20 to 30% by weight, of acrylonitrile and b2.3) from 0 to 20% by weight of other monomers, in the presence of the first phase.

Suitable substances for the other monomers b2.3) are those listed under b1.2) as other monomers for the first phase. The second phase b2) is generally the outer phase of the rubber B, i.e. the rubber B is generally a core-shell polymer, but this structure is not essential.

The rubber phase b2) is preferably compatible at least to some extent with the matrix component A in the thermoplastic molding compositions.

The rubber B may also have other polymer phases, in particular made from polystyrene or from its copolymers, preferably made from polystyrene and from crosslinking agents and/or from grafting monomers. These phases may be outer shells or else the cores of the rubber particles B which have two or more phases.

The viscosity number of the polymer A was measured in accordance with DIN 53726 on a 0.5% strength solution of the polymer in dimethylformamide at 23° C.

The diameters of the rubber particles B, and also the number of these, was determined using an analytical ultracentrifuge and the method of W. Scholtan and H. Lange, Kolloid-Z. und Z.-Polymere 250 (1972) pp. 782–796. The ultracentrifuge measurement gives the integral mass distribution or number distribution of particle diameter in a specimen. This can be used to calculate the percentage by number or by weight of particles having a diameter equal to or smaller than a particular value.

If the rubber B has a third phase, this is preferably composed of at least 80% by weight of styrene and/or derivatives thereof. It preferably forms the core or an intermediate shell of the polymer particles.

The thermoplastic molding compositions preferably have a melt flow rate of at least 2 ml/10 min, preferably at least 4 ml/10 min. The melt flow rate was determined in accordance with ISO 1133 at 220° C. and with 10 kg.

The invention further relates to molded materials, in particular profiles, films or sheets, produced by coextruding from 0.1 to 50% by weight, preferably from 2 to 20% by weight, of molding compositions and from 50 to 99.9% by weight, preferably from 80 to 98% by weight, of a second thermoplastic molding composition formed from one of the following polymers: ABS, PVC, HIPS, SAN, ASA+PC or ABS+PC.

For the purposes of the present invention, and as is known, molded materials are the products, in particular moldings and semifinished products, from processing molding compositions. The ratio of the melt flow rate of the first molding composition to that of the second, in accordance with ISO 1133 at 220° C. and with 10 kg, is preferably from 0.5 to 10, particularly preferably from 1 to 10.

The acrylonitrile content of the first molding composition is preferably greater than the acrylonitrile content of the second molding composition.

Particularly suitable molded materials are those whose rubber particles B have network morphology, i.e. where at least 80% by number of the particles have a point of contact with another particle.

The object of the invention is also achieved by means of blends of the thermoplastic molding compositions defined above with up to 45% by weight of thermoplastic molding compositions which have the same chemical structure but any desired viscosity number of the polymer A and any desired size on the rubber particles B.

The invention further provides a process for producing molded materials by coextrusion, where the coextruded moldings are preferably thermoformed and where the processing temperature of the first molding composition is preferably from 200 to 300° C., in particular from 210 to 280° C.

The novel molding compositions are particularly suitable for producing window profiles, housings, surfacings, coverings, boats, roofs or roof boxes.

The invention is described in further detail below using working examples. Coextruded sheets of width 100 cm and with an ABS layer thickness of 4 mm and an ASA layer thickness of 0.8 mm were produced using a single-screw main extruder, screw diameter 90 mm, extruder length equal to 30 times the screw diameter, at 190° C. in the feed section, from 260 to 270° C. at the die and in the feed-block, and with throughput of about 150 kg/h, and using a single-screw coextruder, screw diameter 45 mm, extruder length equal to 25 times the screw diameter, at 210° C. in the feed section and from 260 to 270° C. at the die and in the feed-block.

Surface mattness was assessed using gloss measurement in accordance with DIN 67530 with a measurement angle of 60°. The gloss of the ASA layer was measured, and gloss of <30% was assessed as optically matt.

The appearance was visually assessed for flow lines.

Examples 1 to 5 (Comparative)

The first thermoplastic molding composition used (ASA1) was composed of 55% by weight of polystyrene-acrylonitrile with a viscosity number of 80 ml/g and an acrylonitrile content of 35%, and of 45% by weight of monodisperse butyl acrylate graft rubber with a particle size of 0.5 µm. The graft rubber was prepared by emulsion polymerization: in a first polymerization step a mixture of butyl acrylate (BA) and dihydrodicyclopentadienyl acrylate (DCPA) in a weight ratio of 98:2 was polymerized. In another polymerization step the rubber particles obtained from the first step were grafted with styrene (S) and acrylonitrile (AN). The SAN:BA+DCPA weight ratio was 40:60. After the rubber dispersion had been prepared, more than 99% by number of the rubber particles had a diameter >0.2 µm. The particle size distribution of the dispersion was measured using an ultracentrifuge.

The graft rubber dispersion was coagulated and the moist rubber from the centrifuge was blended with a PSAN melt at 260° C. in a Werner & Pfleiderer ZSK extruder.

In Comparative Examples 1 to 5 no change was made to the first thermoplastic molding composition ASA 1, which in each case was coextruded with a different second ABS molding composition as listed below:

EXAMPLE 1

ABS 1: Viscosity number of matrix 80 ml/g, acrylonitrile content of matrix 24%, rubber content 30%, melt flow rate at 220° C. and with 10 kg=6 ml/10 min, weight-average diameter 0.35 µm.

EXAMPLE 2

ABS 2: Viscosity number of matrix 80 ml/g, acrylonitrile content of matrix 24%, rubber content 40%, melt flow rate at 220° C. and with 10 kg=3 ml/10 min, weight-average diameter 0.35 µm.

EXAMPLE 3

ABS 3: Viscosity number of matrix 80 ml/g, acrylonitrile content of matrix 35%, rubber content 28%, melt flow rate at 220° C. and with 10 kg=4.5 ml/10 min, weight-average diameter 0.35 µm.

EXAMPLE 4

ABS 4: Viscosity number of matrix 80 ml/g, acrylonitrile content of matrix 33%, rubber content 46%, weight-average diameter 0.35 µm.

EXAMPLE 5

ABS 5: Cycolac® GPX 3700 from General Electric Plastics. In all of the Comparative Examples 1 to 5 glossy surfaces of the sheets were obtained.

In the other Comparative Examples, 6 to 10, the first thermoplastic molding composition used was a molding composition ASA 2 made from 55% by weight of polystyrene-acrylonitrile with a viscosity number of 80 ml/g and an acrylonitrile content of 35%, and 45% by weight of butyl acrylate graft rubber with a particle size of 0.1 µm. The SAN:BA+DCPA weight ratio was 40:60. The molding composition was prepared in the same manner as was ASA 1. In the ASA 2 dispersion obtained more than 99% by number of the particles had diameter <0.2 µm.

Molding composition ASA 2 was then extruded with each of the second molding compositions ABS 1 to ABS 5 listed above. In all of Examples 6 to 10 the surfaces of the coextruded sheets were matt but showed flow lines.

Examples 11 to 15 (Inventive)

The first molding composition (ASA 3) used was a mixture prepared from 55% by weight of polystyrene-acrylonitrile with a viscosity number of 60 ml/g and an acrylonitrile content of 35%, and 45% by weight of butyl acrylate graft rubber. The butyl acrylate graft rubber was the same as that for ASA 2. The first molding composition ASA 3 was then coextruded in turn with, as second molding composition, each of the molding compositions ABS 1 to 5 listed above. In all of Examples 11 to 15 the coextruded sheets obtained had matt surfaces free from flow lines.

We claim:

1. A thermoplastic molding composition which when molded produces articles having matte surfaces and are free from flow lines comprising
   A) from 20 to 90% by weight of a thermoplastic polymer composed of units derived from
      a1) from 60 to 85% by weight of styrene and/or substituted styrene,
      a2) from 15 to 40% by weight of acrylonitrile, and
      a3) from 0 to 25% by weight of other monomers copolymerizable with a1 and a2, and
   B) from 10 to 80% by weight of a crosslinked graft rubber having two or more phases and comprising
      b1) from 30 to 90% by weight of a phase prepared by emulsion polymerization of
         b1.1) from 80 to 100% by weight of an acrylate, and
         b1.2) from 0 to 20% by weight of other monomers, and
      b2) from 10 to 70% by weight of at least one other phase prepared by polymerizing
         b2.1) from 60 to 85% by weight of styrene,
         b2.2) from 15 to 35% by weight of acrylonitrile and
         b2.3) from 0 to 20% by weight of other monomers, in the presence of the first phase,
   wherein the polymer A has a viscosity number, measured on a 0.5% strength solution in dimethylformamide at 23° C., of from 50 to 70 ml/g and at least 80% by number of the rubber particles B in the dispersion, after the preparation thereof, have a diameter of <0.2 µm.

2. A thermoplastic molding composition as defined in claim 1, which has a melt flow rate of at least 2 ml/10 min in accordance with ISO 1133 at 220° C. and with 10 kg.

3. A molded material in the form of a profile, film or sheet, produced by coextruding from 0.1 to 50% by weight of a molding composition as defined in claim 1, and from 50 to 99.9% by weight of a second thermoplastic molding composition formed from a polymer selected from the group consisting of ABS, PVC, HIPS and SAN, or a combination of polymers selected from the group consisting of ASA+PC or ABS+PC.

4. A molded material as defined in claim 3, in which the ratio of the melt flow of the first molding composition to that of the second is from 0.5 to 10.

5. A molded material as defined in claim 3, wherein the acrylonitrile content of the first molding composition is greater than the acrylonitrile content of the second molding composition.

6. A molded material as defined in claim 3, wherein the particles of the rubber B have network morphology.

7. A process for producing molded materials as defined in claim 3 by coextrusion.

8. A process as defined in claim 7, wherein the coextruded moldings are thermoformed.

9. A process as defined in claim 7, wherein the processing temperature for the first molding composition is from 200 to 300° C.

10. A thermoplastic molding composition comprising
- A) from 30 to 80% by weight of a thermoplastic polymer composed of units derived from
  - a1) from 63 to 81% by weight of styrene and/or substituted styrene,
  - a2) from 19 to 37% by weight of acrylonitrile, and
  - a3) from 0 to 20% of other monomers copolymerizable with a1 and a2, and
- B) from 20 to 70% by weight of a crosslinked graft rubber having two or more phases and comprising
  - b1) from 40 to 70% by weight of a phase prepared by emulsion polymerization of
    - b1.1) from 90 to 100% by weight of an acrylate, and
    - b1.2) from 0 to 10% by weight of other monomers, and
  - b2) from 30 to 60% by weight of at least one other phase prepared by polymerizing
    - b2.1) from 70 to 80% by weight of styrene,
    - b2.2) from 20 to 30% by weight of acrylonitrile and
    - b2.3) from 0 to 20% by weight of other monomers, in the presence of the first phase, wherein the polymer A has a viscosity number, measured on a 0.5% strength solution in dimethylformamide at 23° C., of from 55 to 65 ml/g and at least 85% by number, of the rubber particles B in the dispersion, after the preparation thereof, have a diameter of <0.18 µm.

* * * * *